United States Patent
Fisch

(10) Patent No.: US 12,338,911 B2
(45) Date of Patent: Jun. 24, 2025

(54) FLUID VALVE

(71) Applicant: AVS, Ingenieur J.C. Römer GmbH, Grafenau (DE)

(72) Inventor: Rainer Fisch, Hauzenberg (DE)

(73) Assignee: AVS, Ingenieur J.C. Römer GmbH, Grafenau (DE)

( * ) Notice: Subject to any disclaimer, the term of this patent is extended or adjusted under 35 U.S.C. 154(b) by 216 days.

(21) Appl. No.: 18/145,762

(22) Filed: Dec. 22, 2022

(65) Prior Publication Data

US 2023/0204122 A1    Jun. 29, 2023

(30) Foreign Application Priority Data

Dec. 23, 2021    (EP) ..................................... 21217232

(51) Int. Cl.
 *F16K 31/06* (2006.01)
 *H01F 7/14* (2006.01)

(52) U.S. Cl.
 CPC ...... *F16K 31/0682* (2013.01); *F16K 31/0655* (2013.01); *H01F 7/14* (2013.01)

(58) Field of Classification Search
 CPC ............. F16K 31/0655; F16K 31/0682; F16K 31/0627; F16K 31/10
 See application file for complete search history.

(56) References Cited

U.S. PATENT DOCUMENTS

| | | | |
|---|---|---|---|
| 2,245,834 A | 6/1941 | Sparrow | |
| 5,772,179 A * | 6/1998 | Morinigo | ............ F16K 31/0682 123/90.11 |
| 9,631,737 B2 * | 4/2017 | Brust | .................. F16K 31/0682 |
| 10,767,665 B2 * | 9/2020 | Kolbenschlag | ..... F16K 31/0624 |
| 2009/0314975 A1 | 12/2009 | Scheibe | |
| 2023/0204121 A1 * | 6/2023 | Fisch | .................. F16K 31/0675 251/129.2 |

FOREIGN PATENT DOCUMENTS

| | | |
|---|---|---|
| DE | 102013220557 A1 | 4/2015 |
| JP | 2009535008 A | 9/2009 |
| NL | 135637 C | 11/1972 |
| WO | 2007/124826 A1 | 11/2007 |

OTHER PUBLICATIONS

Search Report mailed Jul. 1, 2022, issued in corresponding European Application No. 21217232.4, filed Dec. 23, 2021, 11 pages.
Office Action mailed Dec. 28, 2023, in corresponding Japanese application No. 2022-205174, filed Dec. 22, 2022, 9 pages.

* cited by examiner

*Primary Examiner* — Kevin F Murphy
(74) *Attorney, Agent, or Firm* — Christensen O'Connor Johnson Kindness PLLC

(57) ABSTRACT

A fluid valve having a magnetic drive unit for a valve closing body is provided. The drive unit can have a core, a coil partially surrounding the core, and an armature which can be pivoted about a pivot axis by the energization of the coil and the resulting magnetic force, the valve closing body being in operative connection with the armature and being pivotable by the pivoting of the armature about a pivot axis and being positionable at least in a first and a second pivot position, and the valve closing body having a first and a second leg, the first leg extending into a valve housing having at least one fluid channel and the second leg projecting at an angle from the first leg and establishing the operative connection with the armature.

13 Claims, 3 Drawing Sheets

FLUID VALVE

CROSS-REFERENCE TO RELATED APPLICATION

This application claims priority to European Application Number 21217232.4, filed Dec. 23, 2021, the disclosure of which is hereby incorporated by reference.

FIELD

The present disclosure relates to a fluid valve having a magnetic drive unit by means of which a valve closing body can be moved.

BACKGROUND

Fluid valves having a magnetic drive are already known. In particular, fluid valves are known in which an armature is linearly moved, i.e. shifted, by applying a magnetic field. This linear movement is converted into a pivoting movement of a valve closing body. Depending on the pivoting movement of the valve closing body, a fluid channel in the fluid valve is released or closed.

A major disadvantage of known fluid valves is that-due to the construction of the valve—the application of force into the armature effected by the magnetic field of a coil is low so that relatively large currents through the coil are required in order to be able to switch the fluid valve.

SUMMARY

Based on this, an object of the present disclosure is to provide a fluid valve that allows improved switching behavior with reduced switching currents.

The object is achieved by a fluid valve comprising the features of independent claim 1. Embodiments of the fluid valve are the subject matter of the subclaims.

According to one aspect, a fluid valve comprising a magnetic drive unit for a valve closing body is disclosed. The drive unit comprises a core, a coil partially surrounding the core, and an armature pivotable about a pivot axis by the energization of the coil and the resulting magnetic force. The valve closing body is in operative connection with the armature and can be pivoted about a pivot axis by pivoting the armature. As a result, the valve closing body can be positioned in at least a first and a second pivot position. The valve closing body has a first and a second leg, the first leg extending into a valve housing having at least one fluid channel and the second leg laterally projecting at an angle from the first leg and establishing the operative connection with the armature.

The technical advantage of the fluid valve is that due to the pivotability of the armature and the valve closing body connected thereto, an improved switching behavior of the fluid valve is achieved since lower switching currents are required compared to a linear shift of the armature. Due to the angular design of the valve closing body, it is possible to achieve a space-saving coupling of the valve closing body to the armature and simultaneously a high force introduction.

According to one exemplary embodiment, the first leg is longer than the second leg. This ensures that the stroke or pivot travel of the first leg is greater than the stroke or pivot travel of the second leg. As a result, an increased stroke or pivot travel of the free end of the first leg and thus an improved switching behavior of the fluid valve can be achieved despite a small pivot angle or stroke of the armature.

According to one exemplary embodiment, the first leg is longer than the second leg by at least a factor of 1.5. In particular, the length ratio between the first and second leg is between 1.5 and 2. By dimensioning the length ratio in this way, it is possible to achieve a sufficiently good switching behavior and a simultaneously compact design and high closing force of the valve closing body.

According to one exemplary embodiment, the second leg extends over a partial length of the armature along the longitudinal axis thereof. This allows the pivot axis of the valve closing body to be located in a central region of the armature, and the second leg allows the valve closing body to be coupled to a free end of the armature.

According to one exemplary embodiment, the second leg extends from the pivot axis of the valve closing body in the direction of the side of the armature facing away from the pivot axis of the armature. As a result, the valve closing body can be coupled to the armature region that carries out the greatest stroke when the armature is pivoted.

According to one exemplary embodiment, the first leg projects at right angles or substantially right angles from the second leg. As a result, it is possible to achieve a conversion of the pivoting movement of the armature, which is provided above the valve housing, into a pivoting movement of the first leg of the valve closing body that is oriented perpendicularly or substantially perpendicularly thereto.

According to one exemplary embodiment, the pivot axis of the valve closing body is arranged in the transition area between the first and second leg. As a result, an advantageous conversion of the pivoting movement of the armature into a pivoting movement of the valve closing body can be achieved.

According to one exemplary embodiment, the armature can be moved by the drive unit between a first and a second pivot position, the angle between the first and second pivot position being 5° or smaller. This small angular stroke of the armature renders possible a high force introduction into the armature even when the armature is pivoted away from the pole faces of the core. As a result, the currents through the coil which are necessary to switch the fluid valve are low since even in the state in which the armature is pivoted away from the core, a high force is introduced due to the small distance between the armature and the pole faces of the core.

According to one exemplary embodiment, the core is U-shaped and has a pair of pole faces. The armature is here designed in such a way that it spans the pair of pole faces. In some embodiments, the pivoting of the armature when the coil is energized closes the magnetic circuit between the pole faces. By extending the armature across the pole faces, a high force is applied to the armature, which is used to pivot the valve closing body.

According to one exemplary embodiment, the pivot axis of the armature runs parallel to a plane in which the pole faces of the core are arranged. The pivot axis of the armature, as viewed in the direction of the longitudinal axis of the armature, can be below the pair of pole faces which, viewed in the direction of the longitudinal axis of the armature, are arranged one above the other. This allows the armature to pivot relative to the plane of the pole faces, thereby closing the magnetic circuit when the coil is energized.

According to one exemplary embodiment, the armature is pivotable relative to a plane in which the pole faces of the core are arranged, such that, when energized, the armature is pivoted to a first pivot position towards the pole faces and, when de-energized, is positioned in a second pivot position in which the longitudinal axis of the armature projects obliquely from the plane of the pole faces. The pivoting out of the plane can be carried out by means of the spring force of a spring which is deformed when current is applied to the coil. In the first pivot position, the armature can be a small distance away, for example less than 1 mm, in particular less than 0.5 mm, from the pole faces, i.e. there is no direct abutment against the pole faces. In the first pivot position, the magnetic circuit is closed. In the second pivot position, the distance of the armature from the pole faces (in particular from the pole face furthest away) is at most 5 mm, in particular 4 mm, 3 mm or 2 mm, or 1 mm or less, for example 0.8 mm or substantially 0.8 mm. Due to the small stroke of the pivoting movement, a high force introduction into the armature and thus a high actuating force are generated.

According to one exemplary embodiment, the pivot axis of the armature is provided at a first free end of the armature and the free end of the second leg of the valve closing body is connected to a second free end of the armature that is located opposite to the pivot axis of the armature. This provides an improved mechanical coupling between the armature and the valve closing body since the armature region is coupled to the valve closing body that performs the greatest stroke or pivot travel.

According to one exemplary embodiment, the armature comprises a linking portion for the valve closing body in the region of the second free end. The linking portion is provided on a projection of the armature, which projects from a rear side of the armature that faces away from the core. As a result, the linking portion projects in the direction of a valve housing from the armature, into which at least a portion of the valve closing body projects. It is thus possible to achieve a space-saving coupling of the armature to the valve closing body.

According to one exemplary embodiment, the linking portion forms a support for a free end of the valve closing body, the free end of the valve closing body being pivotably held in the linking portion. The linking portion is configured such that the valve closing body is in operative connection with the armature and thus a pivoting of the armature leads to a pivoting of the valve closing body but the valve closing body itself can also be pivoted relative to the armature. The pivoting point of the armature can, for example, be hook-shaped in cross-section and form a pivot joint site with a free end of the valve closing body. In this way, a force can be transmitted from the armature to the valve closing body and the armature can simultaneously be pivoted relative to the valve closing body.

According to one exemplary embodiment, the pivotability of the armature is limited by the pivot range of the valve closing body in the valve housing in both the energized and the de-energized state of the magnetic drive unit. In other words, the pivoting movement of the armature is not limited by the armature striking against surrounding components of the fluid valve, but the armature is indirectly limited in its pivotability by the valve closing body. As a result, it is not necessary to adjust the pivot travel of the armature, which reduces the manufacturing costs of the fluid valve.

In the sense of the present disclosure, the expressions "approximately", "substantially," or "about" mean deviations from the respective exact value by +/−5-10% and/or deviations in the form of changes that are insignificant for the function.

Further embodiments, advantages and possible applications of the present disclosure also result from the following description of exemplary embodiments and from the drawings. In this connection, all the features described and/or illustrated are in principle the subject matter of the present disclosure, either individually or in any combination, irrespective of their summary in the claims or their back-reference. Also, the contents of the claims are made a part of the description.

BRIEF DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
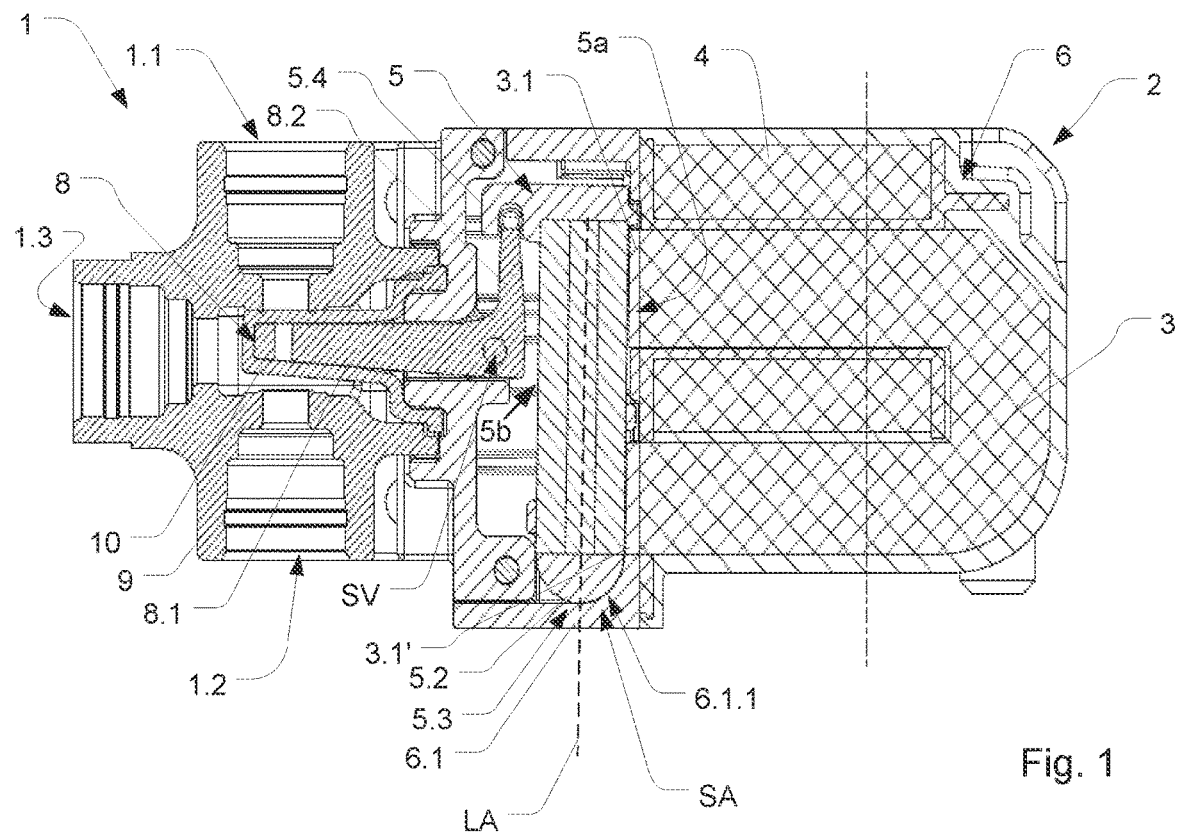
FIG. 1 shows by way of example a longitudinal section through a fluid valve having a first switching state.
Figure 2:
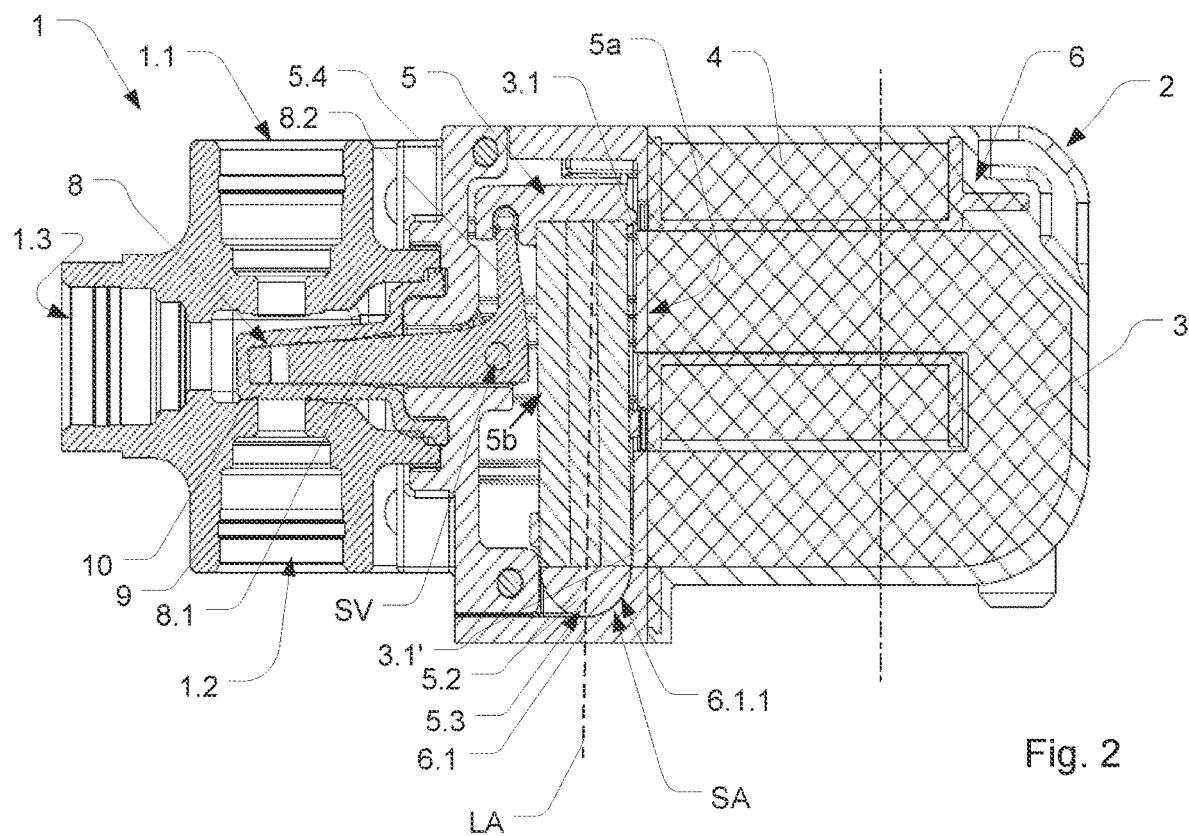
FIG. 2 shows by way of example a longitudinal section through a fluid valve, which has a second switching state.

FIGS. 1 and 2 show, by way of example and schematically, longitudinal sectional views centrally through a fluid valve 1, the drawings merely differing in the switching position of the fluid valve 1.

The fluid valve 1 comprises a drive unit 2 for a valve closing body 8 and a valve housing 9, in which at least one fluid channel is provided. The valve closing body 8 extends into the valve housing 9 and is coupled to the drive unit 2 in such a way that the valve closing body 8 can be moved, in particular pivoted, by the drive unit 2. In particular, the valve closing body 8 can assume a first and a second pivot position in order to release or close a valve opening depending on the pivot position. For example, FIG. 1 shows the first pivot position in which the ports 1.2 and 1.3 are fluidly connected to each other, and FIG. 2 shows the second pivot position of the fluid valve 1, in which the ports 1.1 and 1.3 are fluidly connected to each other.

In the illustrated exemplary embodiment, the valve housing 9 has three ports 1.1, 1.2, 1.3, one pair of ports being fluidically connected to one another in each case depending on the pivot position of the valve closing body 8. Deviating from this, however, the fluid valve 1 can also only have two ports, a fluidic connection between the ports being released or not, depending on the pivot position of the valve closing body 8.

The fluid valve 1 has the following functionality: the drive unit 2 is designed to influence the pivot position of an armature 5. The drive unit 2 is e.g. an electromagnetic drive unit, i.e. when a coil 4 of the drive unit is energized, a magnetic force is generated by means of which the armature 5 is moved from a second pivot position (see FIG. 2) to a first pivot position. This first pivot position is shown in FIG. 1, and the second pivot position is shown in FIG. 2. The armature 5 is held in this first pivot position as long as the coil 4 is energized. The armature 5 can be spring-loaded by means of a spring in such a way that it is returned to the second pivot position after the current flow through the coil 4 has ended.

As shown in FIG. 1, the valve closing body 8 is coupled to the armature 5 in such a way that the valve closing body 8 is moved, in particular pivoted, by the armature 5. In particular, the valve closing body 8 assumes a first or second pivot position in the valve housing 9 depending on the pivot position of the armature 5 and thus defines the valve position or the release or closing of a fluid channel. In particular, a sealing diaphragm 10 surrounds the portion of the valve closing body 8 that extends into the valve housing 9. This sealing diaphragm 10 is pressed against a valve seat of the valve housing 9 by the valve closing body 8 depending on the pivot position so that a fluid channel is selectively opened or closed depending on the pivot position of the valve closing body 8.

The drive unit 2 comprises a main body 6. The main body 6 forms the supporting basic structure of the drive unit 2. It can be designed as an injection-molded part, in particular as a plastics injection-molded part. The main body 6 has a tubular or substantially tubular support for the coil 4. A first insertion opening is formed within the support, into which a leg of a U-shaped core 3 can be inserted.

The main body 6 also comprises an armature support 6.1. This armature support 6.1 directly adjoins the support of the coil 4 and is designed to pivotably mount the armature 5. The armature support 6.1 is of box-like, in particular rectangular box-like design and has a bottom region and a plurality of wall regions. The wall regions are connected to the bottom region, surround the bottom region circumferentially and project from the bottom region to a side facing away from the coil 4.

A second insertion opening is provided in the bottom region, into which a second leg of a U-shaped core 3 is insertable. The U-shaped core 3 is thus yoke-shaped, one leg of the core 3 being surrounded by the coil 4 so that, when the coil 4 is energized, a closed magnetic circuit is formed by the core 3 and the armature 5 spanning the pole faces 3.1, 3.1' of the core 3.

A bearing portion 5.2 is provided on the armature 5. The bearing portion 5.2 has a bearing area 5.3 by means of which the armature 5 is pivotably mounted in the main body 6 of the drive unit 2. Due to the pivotable mounting of the armature 5, the armature can assume the above described pivot positions, in particular a second pivot position in which the armature 5 is pivoted out of a plane running parallel to the pole faces 3.1, 3.1' (FIG. 2), and a first pivot position in which a longitudinal axis LA of the armature 5 runs parallel or substantially parallel to a plane in which the pole faces 3.1, 3.1' of the core 3 are located or is pivoted towards the pole faces 3.1, 3.1' (FIG. 1).

In some embodiments, the longitudinal axis of the armature 5 in the first pivot position encloses with the longitudinal axis of the armature 5 in the second pivot position an angle that is smaller than 5°, in particular smaller than 4°, 3° or 2°. In other embodiments, the angle is smaller than 1.8°.

Due to the low pivotability, a high force transmission into the armature 5 is achieved even when the latter is in the second pivot position, i.e. is pivoted away from the pole faces 3.1, 3.1' of the core 3, since the air gap between the armature 5 and the pole faces 3.1, 3.1' is small.

The bearing portion 5.2 is provided on a first free end of the armature 5. The bearing area 5.3 provided at the bearing portion 5.2 can form a plain bearing area formed externally on the bearing portion 5.2. The bearing area 5.3 interacts with a plane bearing mating surface 6.1.1 provided on the main body 6. The mounting portion 5.2 is here inserted into the anchor support 6.1 of the main body 6 in such a way that a surface bearing is formed between the mounting portion 5.2 and the armature support 6.1, i.e. the bearing area 5.3 abuts against the plain bearing mating surface 6.1.1 so as to achieve the pivotable mounting of the armature 5.

The bearing area 5.3 of the bearing portion 5.2 has the shape of a circular arc in cross-section on the outer circumference, i.e. forms a curved sliding surface. The bearing area 5.3 is in interlocking contact with the concave plain bearing mating surface 6.1.1 of the armature support 6.1, which is shaped inversely to the bearing area 5.3. As a result, the armature 5 can be pivoted about a pivot axis SA which runs parallel to a plane in which the pole faces 3.1, 3.1' of the core 3 are arranged, or which (pivot axis SA) runs perpendicularly to the longitudinal axis LA of the armature 5. This allows the armature 5 to be pivoted towards or away from the upper pole face 3.1.

A linking portion 5.4 is provided on the side of the armature 5 that is opposite the bearing portion 5.2. The armature 5 is coupled to the valve closing body 8 via this linking portion 5.4. The linking portion 5.4 has, for example, a recess in which a portion, in particular a free-end portion, of the valve closing body 8 engages. An inverse design is also conceivable in principle, i.e. that the valve closing body 8 has a recess in which a projection of the linking portion 5.4 engages. The coupling between the armature 5 and the valve closing body 8 via the linking portion 5.4 is designed in particular in such a way that the linking portion 5.4 allows the valve closing body 8 to be pivoted relative to the armature 5. In the illustrated exemplary embodiment, this is achieved by means of a pivot joint-like coupling between the armature 5 and the valve closing body 8.

The linking portion 5.4 is provided, for example, on a hook-shaped projection of the armature 5, which projects from a rear side 5b of the armature 5. The rear side 5b is opposite the front side 5a of the armature 5, which faces the pole faces 3.1, 3.1' of the core 3. It is thus possible to achieve a space-saving coupling of the armature 5 to the valve closing body 8.

The valve closing body 8 is described in more detail below. The valve closing body 8 is here shown in FIGS. 3 to 5 in each case in a stand-alone position and in different views.

Figure 3:
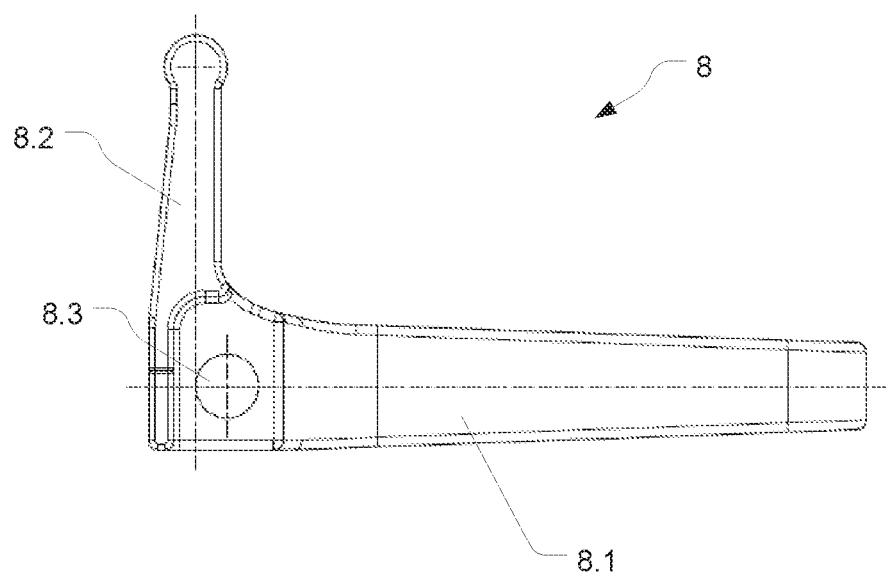
FIG. 3 shows by way of example a side view of a valve closing body.
Figure 4:
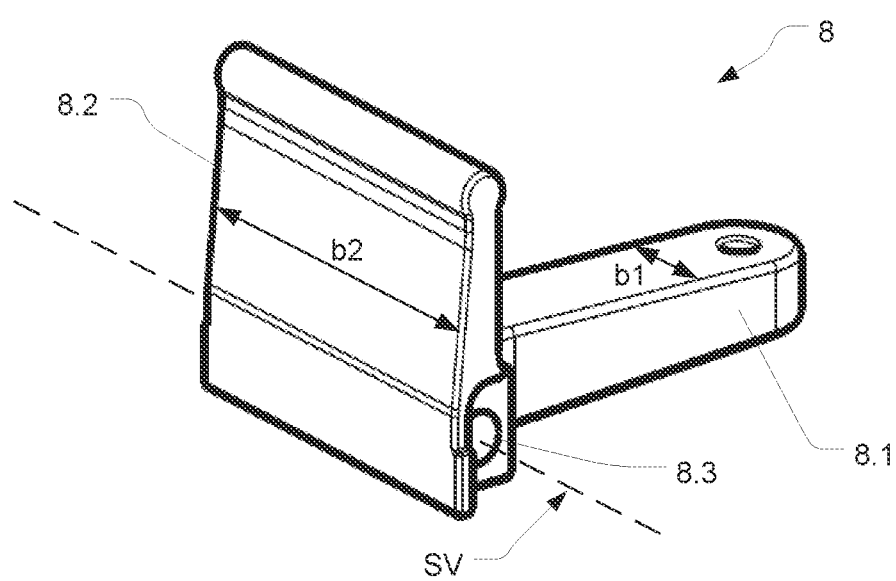
FIG. 4 shows by way of example a perspective view of a valve closing body.
Figure 5:
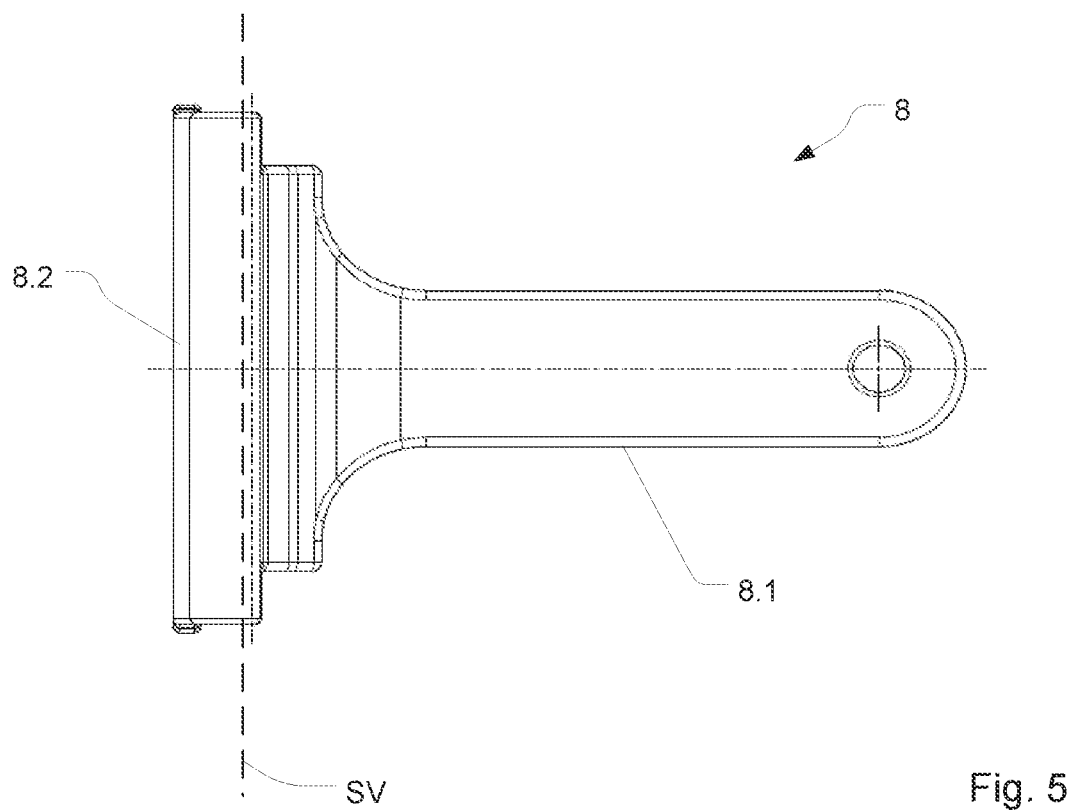
FIG. 5 shows by way of example a top view of a valve closing body.

As can be seen in particular in FIGS. 3 and 4, the valve closing body 8 can be of angular design and has a first and second leg 8.1, 8.2. The longitudinal axes of the legs 8.1, 8.2 enclose, for example, an angle between 80° and 100° with each other. In particular, the angle between the longitudinal axes of the legs 8.1, 8.2 is 90° or substantially 90°. The first leg 8.1 is designed to extend into the valve housing 9. The second leg 8.2 projects laterally from the first leg 8.1 and runs substantially parallel to the longitudinal axis LA of the armature 5. The free end of the second leg 8.2 is coupled to the armature 5 via the linking portion 5.4 to establish the mechanical connection between the armature 5 and the valve closing body 8. In some embodiments, the valve closing body 8 is directly, i.e. without further intermediate elements, coupled to the armature 5 by means of the second leg 8.2.

In the transition area between the first and the second leg 8.1, 8.2, the valve closing body 8 has, for example, a bore 8.3 into which a bolt can be inserted and by means of which the valve closing body 8 is pivotably held in the drive unit 2. The bore 8.3 thus defines the pivot axis SV of the valve closing body 8.

As can be seen in particular in FIG. 3, the first leg 8.1 of the valve closing body 8 is longer than the second leg 8.2. This ensures that the pivot travel of the first leg 8.1 is longer than the pivot travel of the second leg 8.2 so that, even with a small stroke of the armature 5 between its first and second pivot position, the free end of the first leg 8.1 performs an increased stroke. This results in a sufficiently large spacing of the free end of the first leg 8.1 from a valve seat formed in the valve housing.

The first leg 8.1 can be at least 1.5 times longer, in particular at least 1.7 times longer, than the second leg 8.2. In other embodiments, the ratio is 1.8 or substantially 1.8.

As is apparent in particular in FIG. 4, the legs 8.1, 8.2 have different widths. In particular, the width b2 of the second leg 8.2 is greater than the width b1 of the first leg 8.1. In particular, the valve closing body 8 can also be wider in the area of the bore 8.3 than the first leg 8.1. Due to the increased width of the second leg 8.2 compared to the first leg 8.1, an improved coupling of the valve closing body 8 to the armature 5 is achieved. The increased width of the valve closing body 8 in the area of the bore 8.3 results in an improved mounting of the valve closing body 8 in the drive unit 2.

In some embodiments, the armature 5 is held in the armature support 6.1 without a stop, i.e. the pivoting movement of the armature 5 is not limited in either the first or the second pivot position by an armature portion abutting against components surrounding the armature 5. The pivoting movement of the armature 5 is rather limited by the valve closing body 8, which comes into abutment against abutment surfaces in the valve housing 9 depending on the pivot position of the armature 5. The abutment surfaces can in particular be valve seats formed in the valve housing 9. It should be noted that also in the second pivoted position of the armature 5, which is assumed when current flows through the coil 4, the armature 5 is/are spaced from the pole surfaces 3.1, 3.1'. The distance can be less than 1 mm, in particular less than 0.5 mm, in order to achieve a high force transmission into the armature 5.

The present disclosure has been described above with reference to exemplary embodiments. It is understood that numerous modifications as well as variations are possible without leaving the scope of protection defined by the claims.

LIST OF REFERENCE SIGNS

1 fluid valve
1.1 port
1.2 port
1.3 port
2 drive unit
3 core
3.1, 3.1' pole face
4 coil
5 armature
5a front side of armature
5b rear side of armature
5.2 bearing portion
5.3 bearing area
5.4 linking portion
6 main body
6.1 armature support
6.1.1 plain bearing mating surface
8 valve closing body
8.1 first leg
8.2 second leg
8.3 bore
9 valve body
10 sealing diaphragm
LA longitudinal axis of the armature
SA pivot axis of the armature
SV pivot axis of the valve closing body
b1 width of the first leg
b2 width of the second leg In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. A fluid valve, comprising:
a magnetic drive unit for a valve closing body, wherein the drive unit includes:
a core;
a coil which partially surrounds the core; and
an armature which can be pivoted about a pivot axis by the energization of the coil and the resulting magnetic force,
wherein the valve closing body is in operative connection with the armature and is pivotable about a pivot axis by the pivoting of the armature and can be positioned at least in a first and a second pivot position, and
wherein the valve closing body has a first and a second leg, wherein the first leg is longer than the second leg, wherein the first leg extends into a valve housing having at least one fluid channel and the second leg laterally projects at an angle from the first leg and establishes the operative connection with the armature, wherein the second leg extends over a partial length of the armature along a longitudinal axis of the armature, and wherein the second leg runs substantially parallel to the longitudinal axis of the armature.

2. The fluid valve of claim 1, wherein the first leg is longer than the second leg by at least a factor of 1.5.

3. The fluid valve of claim 1, wherein the second leg extends from the pivot axis of the valve closing body in the direction of the side of the armature that faces away from the pivot axis of the armature.

4. The fluid valve of claim 1, wherein the first leg extends perpendicular or substantially perpendicular to the second leg.

5. The fluid valve of claim 1, wherein the pivot axis of the valve closing body is arranged in the transition area between the first and second leg.

6. The fluid valve of claim 1, wherein the armature is movable by the drive unit between a first and a second pivot position, the angle between the first and second pivot position being 5° or smaller.

7. The fluid valve of claim 1, wherein the core is U-shaped and has a pair of pole faces and in that the armature is configured such that it spans the pair of pole faces.

8. The fluid valve of claim 7, wherein the pivot axis of the armature runs parallel to a plane in which the pair of pole faces of the core are arranged.

9. The fluid valve of claim 7, wherein the armature can be pivoted relative to a plane in which the pair of pole faces of the core are arranged, namely in such a way that, in the energized state, the armature is pivoted in a first pivot position towards the pole faces and, in the de-energized state, is positioned in a second pivot position in which the longitudinal axis of the armature projects obliquely from the plane of the pair of pole faces.

10. The fluid valve of claim 1, wherein the pivot axis of the armature is provided at a first free end of the armature and in that a free end of the second leg of the valve closing body is connected to a second free end of the armature that is opposite the pivot axis of the armature.

11. The fluid valve of claim 10, wherein the armature has, in the region of the second free end, a linking portion for the valve closing body, and in that the linking portion is provided at a projection of the armature, which projects at a rear side of the armature that faces away from the core.

12. The fluid valve of claim 11, wherein the linking portion forms a support for the free end of the second leg of the valve closing body, the free end of the second leg of the valve closing body being pivotably held in the linking portion.

13. The fluid valve of claim 1, wherein the pivotability of the armature is limited in both the energized and de-energized state of the magnetic drive unit by the pivot range of the valve closing body in the valve housing.

* * * * *